United States Patent [19]

Lüder et al.

[11] Patent Number: 5,792,957

[45] Date of Patent: *Aug. 11, 1998

[54] CAPACITIVE PRESSURE SENSORS WITH HIGH LINEARITY BY OPTIMIZING ELECTRODE BOUNDARIES

[75] Inventors: Ernst Lüder, Stuttgart; Traugott Kallfass, Grossbottwar; Hubert Benzel, Pliezhausen; Joerg Schaepperle, Stuttgart, all of Germany

[73] Assignee: Endress + Hauser GmbH + Co., Maulburg, Germany

[*] Notice: This patent issued on a continued prosecution application filed under 37 CFR 1.53(d), and is subject to the twenty year patent term provisions of 35 U.S.C. 154(a)(2).

[21] Appl. No.: 277,182

[22] Filed: Jul. 19, 1994

[30] Foreign Application Priority Data

Jul. 24, 1993 [EP] European Pat. Off. ............ 93111832

[51] Int. Cl.$^6$ .................................................. G01L 9/12
[52] U.S. Cl. ........................... 73/724; 73/718; 361/283.4
[58] Field of Search ................... 73/724, 718; 361/283.4

[56] References Cited

U.S. PATENT DOCUMENTS

| | | |
|---|---|---|
| 4,227,419 | 10/1980 | Park . |
| 4,422,335 | 12/1983 | Ohnesorge et al. ............ 73/724 |
| 4,977,480 | 12/1990 | Nishihara ................. 361/283.4 |

FOREIGN PATENT DOCUMENTS

| | | |
|---|---|---|
| 0 211 519 | 2/1987 | European Pat. Off. . |
| 41 07 345 | 9/1992 | Germany . |
| WO 89/10546 | 11/1989 | WIPO . |
| WO 93/11415 | 6/1993 | WIPO . |

*Primary Examiner*—Joseph L. Felber
*Attorney, Agent, or Firm*—Bose McKinney & Evans

[57] ABSTRACT

In a first variant of this pressure sensor with a substrate and a diaphragm which are joined together parallel to each other in a defined spaced relationship, forming a chamber sealed at least at the edge, the chamber-side surface of the diaphragm is completely covered with a diaphragm electrode. The chamber-side surface of the substrate supports a reference electrode consisting of an outer portion, which extends along the edge of the chamber and whose capacitance is virtually pressure-independent, and a pressure-dependent central portion, which is located at the center of the substrate and is connected with the outer portion via a connecting portion. The remainder of the substrate surface is covered with a measuring electrode spaced from the reference electrode by a constant distance. In a second circular variant and in a third, rectangular variant, the reference electrode consists of an outer portion, which extends along the edge of the chamber and whose capacitance is virtually pressure-independent, and two pressure-dependent central portions, which are each located in one half of the substrate symmetrically with respect to the substrate center and are connected with the outer portion via one connecting portion each, and whose boundary curves are continuous and are optimized by an iterative method. In a third variant, the reference electrode differs from that of the second variant in that it is not centrosymmetrical, but symmetrical with respect to a substrate diameter.

1 Claim, 7 Drawing Sheets

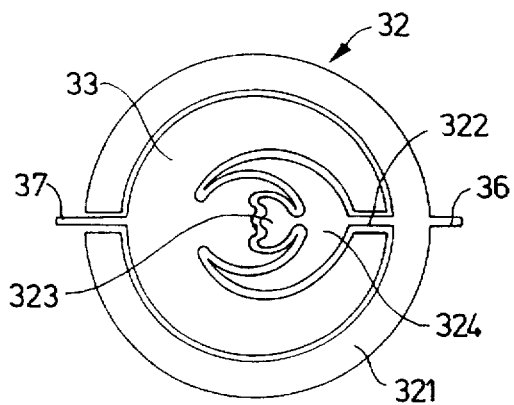
FIG. 12a
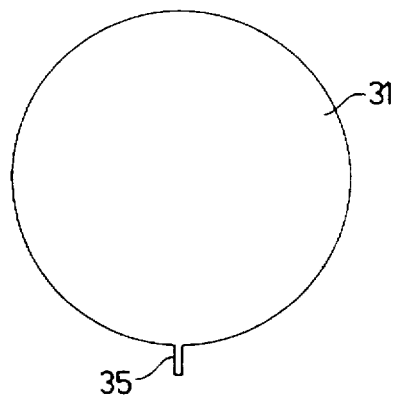
FIG. 12b
|  | B | | A | |
|---|---|---|---|---|
| $\frac{Pm}{Po}$ | $F_{max}$ | $L_{max}/\%$ | $F_{max}$ | $L_{max}/\%$ |
| 0.4 | 0.12 | 0.071 | 0.22 | -2.1 |
| 0.6 | 0.20 | 0.257 | 0.34 | -3.9 |
| 0.8 | 0.31 | 0.794 | 0.50 | -6.8 |
FIG. 13
|  | A | B | C | |
|---|---|---|---|---|
| P | 0-2hPa | 0-2hPa | 0-2hPa | 0-5hPa |
| F | 0-0.22 | 0-0.12 | 0-0.085 | 0-0.2 |
| L | -2.1% | ±0.071% | <±0.05% | <±0.05% |
| $C_o, C_{ro}$ | 75pF | 71pF | 65pF | 65pF |
| $H_c$ | 24pF | 16pF | 16pF | 130pF |
| $H_{Cr}$ | 2.7pF | 5.3pF | 9pF | 95pF |
| $H_r$ | 28.4% | 15.1% | 11% | 54% |
FIG. 14

CAPACITIVE PRESSURE SENSORS WITH HIGH LINEARITY BY OPTIMIZING ELECTRODE BOUNDARIES

FIELD OF THE INVENTION

The present invention relates to capacitive pressure sensors with a pressure characteristic of high linearity.

BACKGROUND OF THE INVENTION

DE-A 41 07 345 discloses a linearized capacitive pressure sensor with a substrate and a diaphragm which are joined together parallel to each other in a defined spaced relationship, forming a chamber sealed at least at the edge, with a) the chamber-side surface of the substrate supporting a substrate electrode completely covering said surface, and b) the chamber-side surface of the diaphragm supporting
   b1) a virtually pressure-independent reference electrode extending along the edge of the chamber,
   b2) a measuring electrode covering a major portion of the remainder of the diaphragm surface and spaced a constant distance from the reference electrode, and
   b3) a further electrode covering the remainder of the diaphragm surface and spaced a constant distance from the reference electrode and having a smaller capacitance and area than the measuring electrode.

The three capacitors of this arrangement formed by the substrate electrode and the three diaphragm electrodes are operated in a measuring circuit whose transfer function F depends on the measuring capacitance C(p), which is determined by a pressure p applied to the pressure sensor, on the pressure-independent reference capacitance $C_r$, and on the pressure-dependent additional capacitance $C_z(p)$ as follows:

$$F = |C(p) - C_r|/C_z(p).$$

The linearity of this arrangement in this measuring circuit, i.e., the linearity of the transfer function F of the circuit, is achieved essentially by dimensioning the areas of the measuring electrode, additional electrode, and reference electrode in a suitable manner.

WO-A 93/11415, whose national U.S. part has been given the Ser. No. 08/090,183, now abandoned, discloses a capacitive pressure sensor with a substrate and a diaphragm which are joined together parallel to each other in a defined spaced relationship, forming a chamber sealed at least at the edge, with a) the chamber-side surface of the substrate being circular and supporting a substrate electrode completely covering said surface, and b) the chamber-side surface of the diaphragm being circular and supporting
   b1) a virtually pressure-independent reference electrode extending along the edge of the chamber,
   b2) a measuring electrode covering a portion of the remainder of the diaphragm surface and spaced a constant distance from the reference electrode, and
   b3) a further electrode covering the remainder of the diaphragm surface and spaced a constant distance from the reference electrode,
       b31) which is located in both halves of the diaphragm symmetrically with respect to the center of the diaphragm and
       b32) whose boundary curve has a specific shape.

The three capacitors of this arrangement are also operated in a measuring circuit whose transfer function F depends on the measuring capacitance C(p), which is determined by a pressure p applied to the pressure sensor, on the pressure-independent reference capacitance $C_r$, and on the pressure-dependent additional capacitance $C_z(p)$ as follows:

$$F = |C(p) - C_r|/C_z(p).$$

SUMMARY OF THE INVENTION

Based on this prior art, the invention has for its object to simplify the above capacitive pressure sensors so that the additional electrode can be dispensed with, i.e., to provide pressure sensors which have only one measuring electrode and one reference electrode. The good linearity of the arrangement disclosed in WO-A 93/11415 is to be reached or even substantially improved in a comparable measuring circuit.

According to a first variant, the invention consists in the provision of a capacitive pressure sensor comprising a substrate and a diaphragm which are joined together parallel to each other in a defined spaced relationship, forming a chamber sealed at least at the edge, with a) the chamber-side surface of the diaphragm supporting a diaphragm electrode completely covering said surface, and b) the chamber-side surface of the substrate supporting
   b1) a reference electrode consisting of
       b11) an outer portion, which extends along the edge of the chamber and whose capacitance is virtually pressure-independent, and
       b12) a pressure-dependent central portion connected with said outer portion via a connecting portion and located at the center of the substrate, and
   b2) a measuring electrode covering the remainder of the substrate surface and spaced an essentially constant distance from the reference electrode.

According to a second variant, the invention further consists in the provision of a capacitive pressure sensor comprising a substrate and a diaphragm which are joined together parallel to each other in a defined spaced relationship, forming a chamber sealed at least at the edge, with a) the chamber-side surface of the diaphragm being circular and supporting a diaphragm electrode completely covering said surface, b) the chamber-side surface of the substrate being circular and
   b1) supporting a reference electrode consisting of
       b11) an outer portion, which extends along the edge of the chamber and whose capacitance is virtually pressure-independent, and
       b12) two pressure-dependent central portions connected with said outer portion via one connecting portion each,
           b121) which are each located in one half of the substrate symmetrically with respect to the substrate center, and
           b122) whose boundary curves are continuous and are optimized by an iterative process, and
   b2) a measuring electrode covering the remainder of the substrate surface and spaced an essentially constant distance from the reference electrode.

According to a third variant, the invention further consists in the provision of a capacitive pressure sensor comprising a substrate and a diaphragm which are joined together parallel to each other in a defined spaced relationship, forming a chamber sealed at least at the edge, with

3 a) the chamber-side surface of the diaphragm being rectangular and supporting a diaphragm electrode completely covering said surface,
b) the chamber-side surface of the substrate being rectangular and
   b1) supporting a reference electrode consisting of
      b11) an outer portion, which extends along the edge of the chamber and whose capacitance is virtually pressure-independent, and
      b12) two pressure-dependent central portions connected with said outer portion via one connecting portion each,
         b121) which are each located in one half of the substrate symmetrically with respect to the substrate center, and
         b122) whose boundary curves are continuous and are optimized by an iterative process, and
   b2) a measuring electrode covering the remainder of the substrate surface and spaced an essentially constant distance from the reference electrode.

Finally, according to a fourth variant, the invention consists in the provision of a capacitive pressure sensor comprising a substrate and a diaphragm which are joined together parallel to each other in a defined spaced relationship, forming a chamber sealed at least at the edge, with
a) the chamber-side surface of the diaphragm being circular and supporting a diaphragm electrode completely covering said surface,
b) the chamber-side surface of the substrate being circular and
   b1) supporting a reference electrode consisting of
      b11) an outer portion, which extends along the edge of the chamber and whose capacitance is virtually pressure-independent, and
      b12) a pressure-dependent middle portion connected with said outer portion via a connecting portion and with an adjoining pressure-dependent central portion,
         b121) which are located in both halves of the substrate symmetrically with respect to a substrate diameter and
         b122) whose boundary curves are continuous and are optimized by an iterative process, and
   b2) a measuring electrode covering the remainder of the substrate surface and spaced an essentially constant distance from the reference electrode.

To operate the first three variants of the invention in a differential-path-amplifier-like measuring circuit, further developments of these three variants use a capacitive pressure sensor with a diaphragm electrode and a reference electrode divided into two halves which are substantially equal in area, with one half of the diaphragm electrode located exactly opposite one half of the reference electrode, and the other diaphragm-electrode half located exactly opposite the other reference-electrode half.

In the first variant and its development, the diaphragm and the substrate preferably have circular inner surfaces which, in a further preferred embodiment for operation in a differential-path-amplifier-like measuring circuit, may be divided along a diameter into two halves which are substantially equal in area.

The measuring circuit is a conventional circuit which has the following transfer function F:

$$F = |C(p) - C_r(p)|/C(p).$$

BRIEF DESCRIPTION OF THE DRAWINGS

The invention will become more apparent from the following description of embodiments taken in conjunction with the accompanying drawings, in which:

4

Figures 1A, 1B:
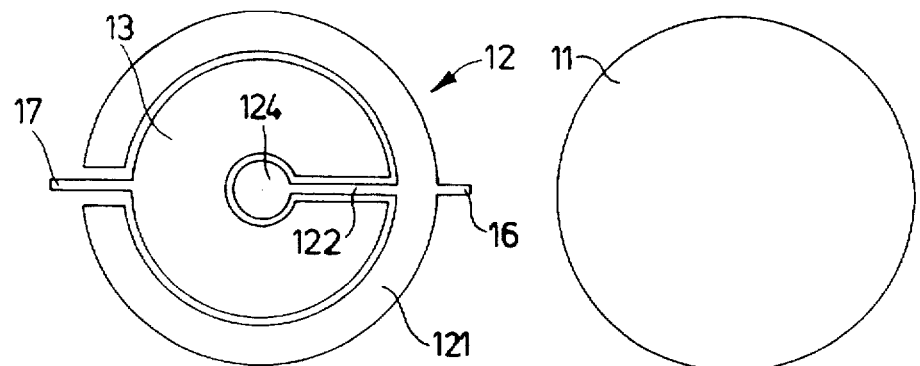
Figures 2A, 2B:
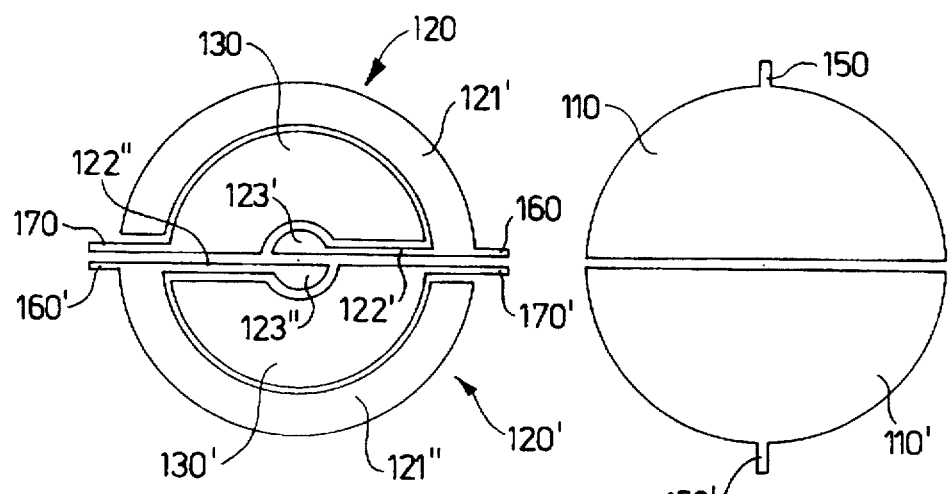
Figure 3:
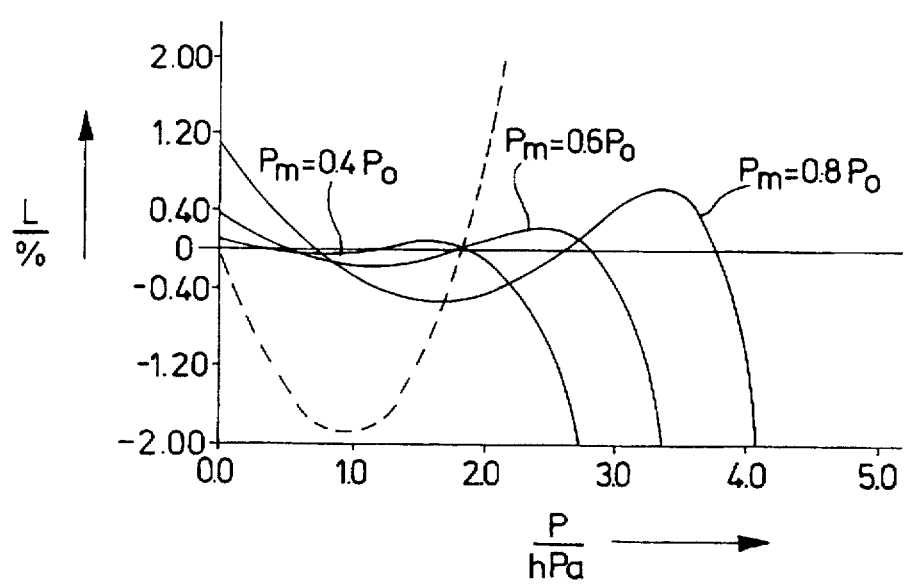
Figure 4A:
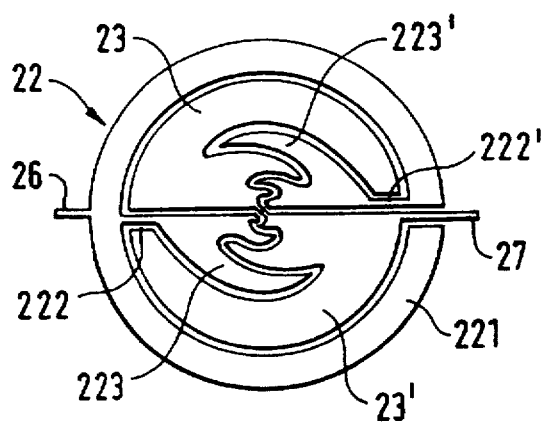
Figure 4B:
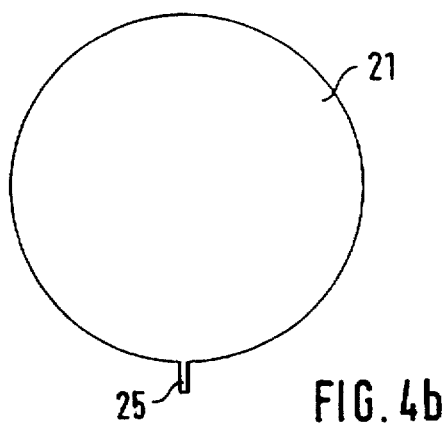
Figure 5A:
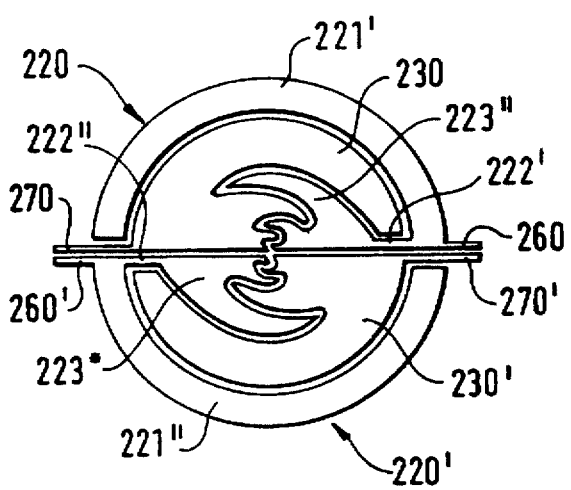
Figure 5B:
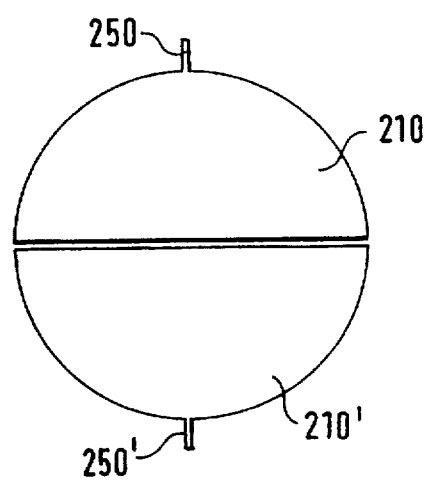
Figure 6:
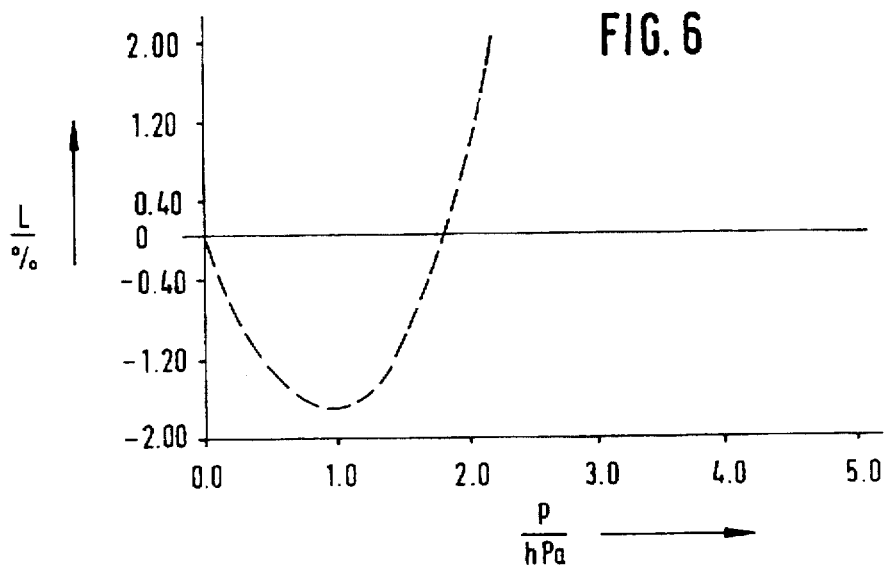
Figure 7:
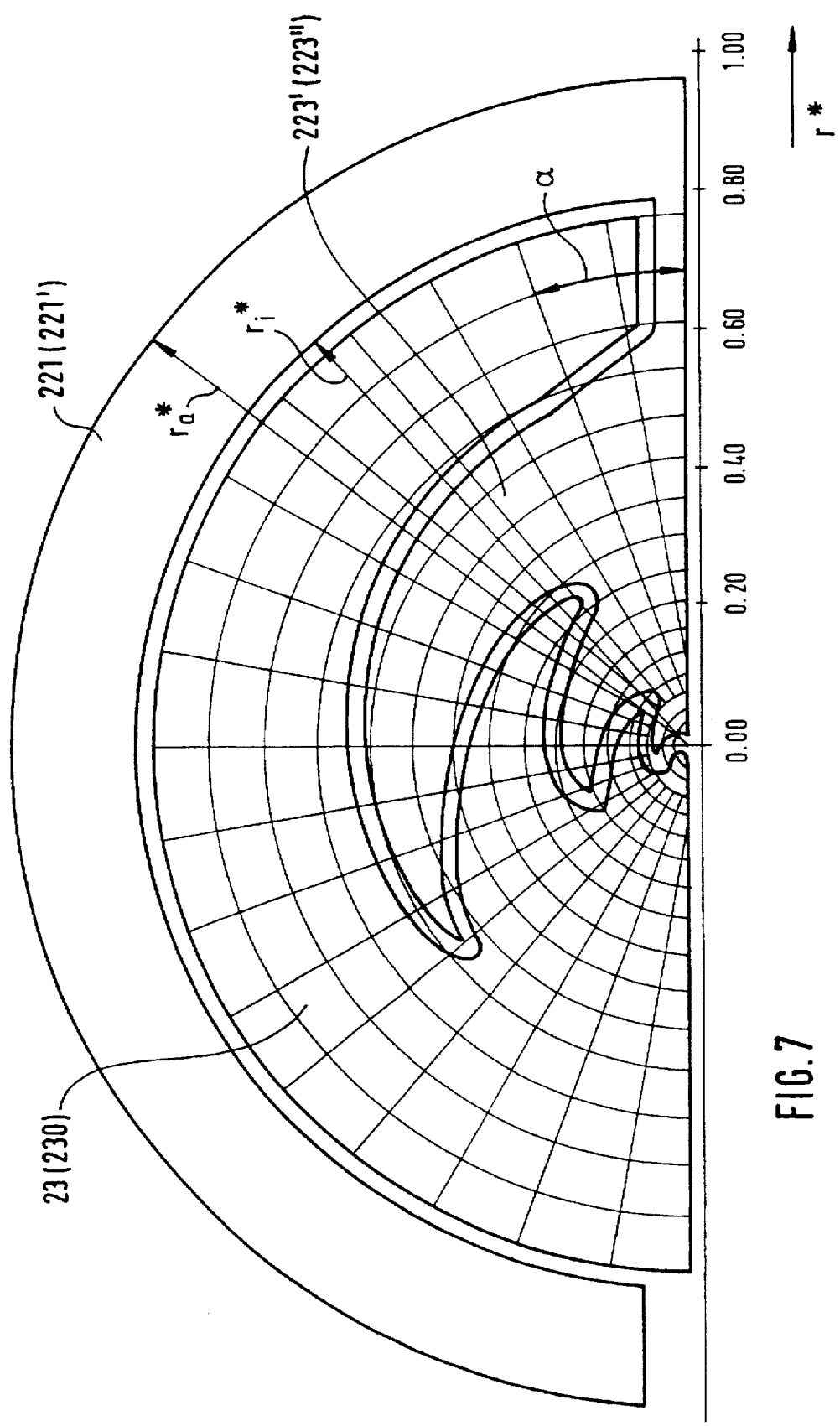
Figure 8:
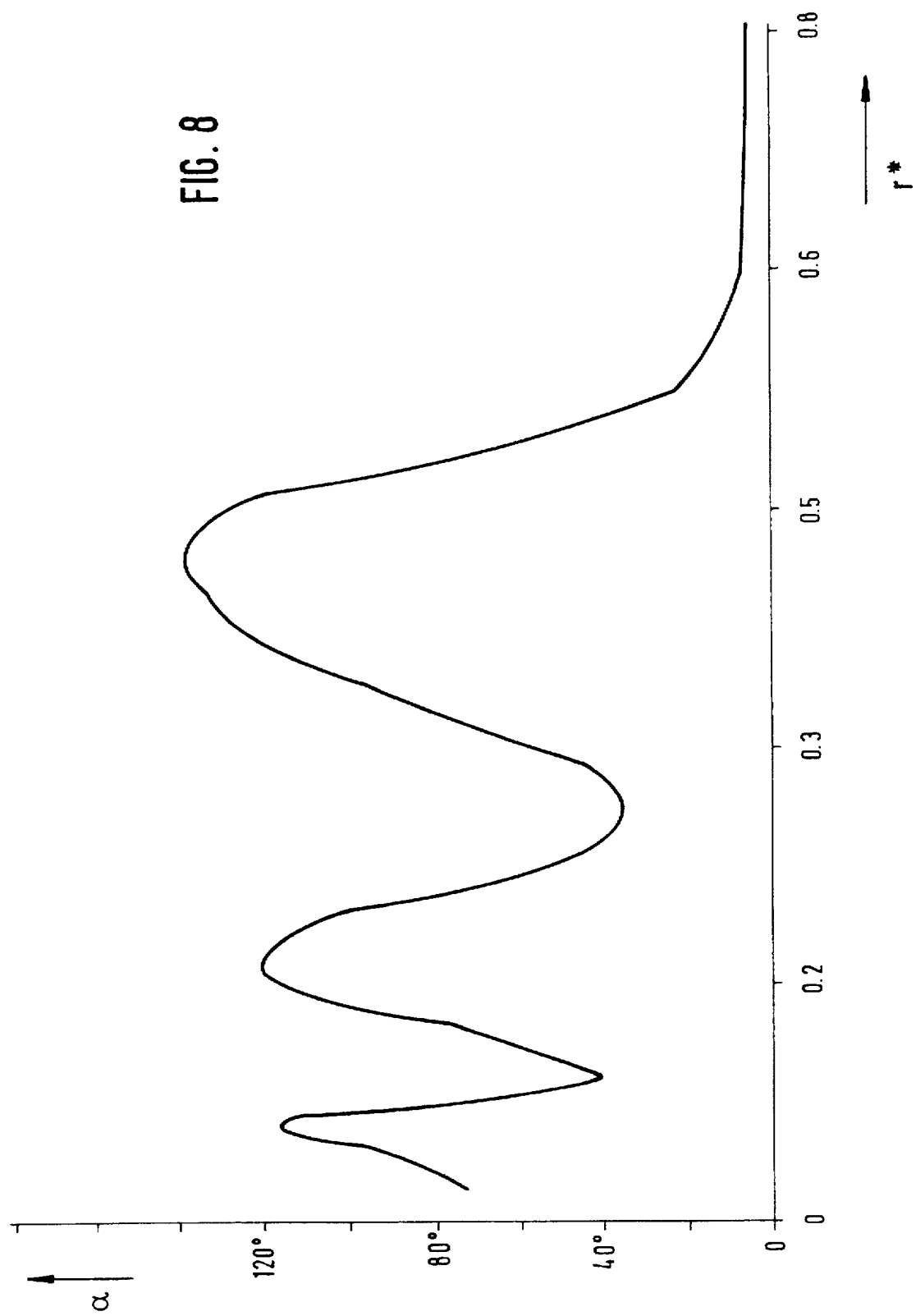
Figure 9A:
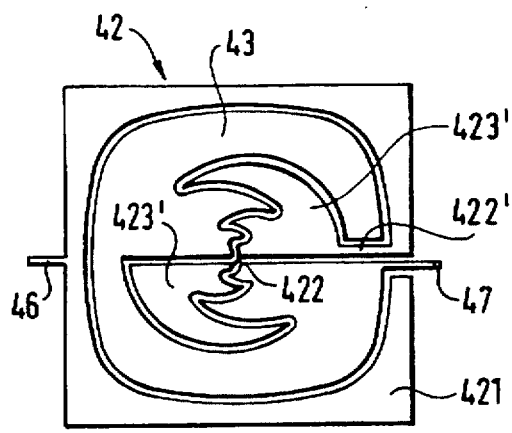
Figure 9B:
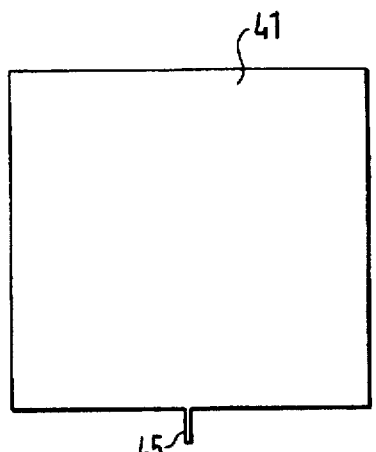
Figure 10A:
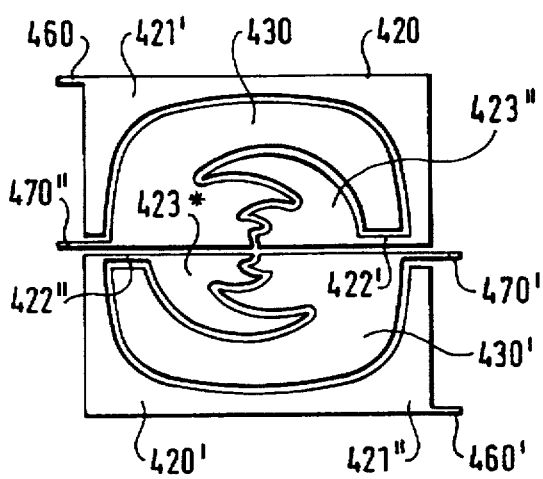
Figure 10B:
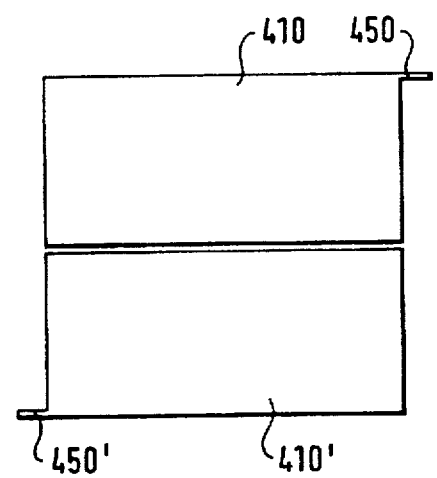
Figure 11:
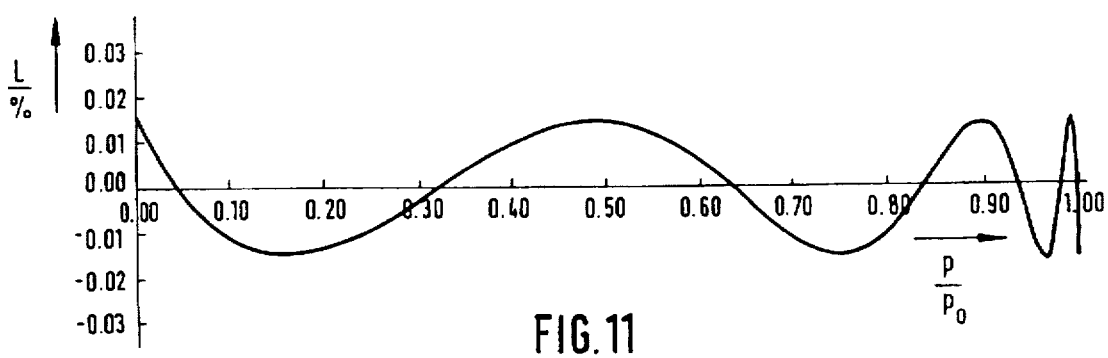

FIGS. 1a and 1b shows top views of the inner surfaces of the substrate and diaphragm of the first variant of the invention;

FIGS. 2a and 2b shows top views of the inner surfaces of the substrate and diaphragm of a development of the pressure sensor of FIG. 1;

FIG. 3 shows a family of characteristics of the linearity error of a pressure sensor as illustrated in FIG. 1;

FIGS. 4a and 4b shows top views of the inner surfaces of the substrate and diaphragm of the second variant of a pressure sensor according to the invention;

FIGS. 5a and 5b shows top views of the inner surfaces of the substrate and diaphragm of a development of the pressure sensor of FIG. 4;

FIG. 6 shows a curve of the linearity error of a pressure sensor as illustrated in FIG. 4;

FIG. 7 shows, in polar coordinates, the shape of the boundary curve of the central electrode portion, which is determined by iteration;

FIG. 8 shows the curve of FIG. 7 in Cartesian coordinates;

FIGS. 9a and 9b shows top views of the inner surfaces of the substrate and diaphragm of the third variant of a pressure sensor according to the invention;

FIGS. 10a and 10b shows top views of the inner surfaces of the substrate and diaphragm of a development of the pressure sensor of FIG. 9;

FIG. 11 shows a curve of the linearity error of a pressure sensor as illustrated in FIG. 10;

FIG. 12a and 12b shows top views of the inner surfaces of the substrate and diaphragm of the fourth variant of a pressure sensor according to the invention;

FIG. 13 shows a table corresponding to FIG. 3;

FIG. 14 shows a further table with characteristics of various implemented pressure sensors according to the invention, and FIGS. 15a–15d illustrates various geometric relations in pressure sensors.

DETAILED DESCRIPTION OF THE INVENTION

Figure 15A:
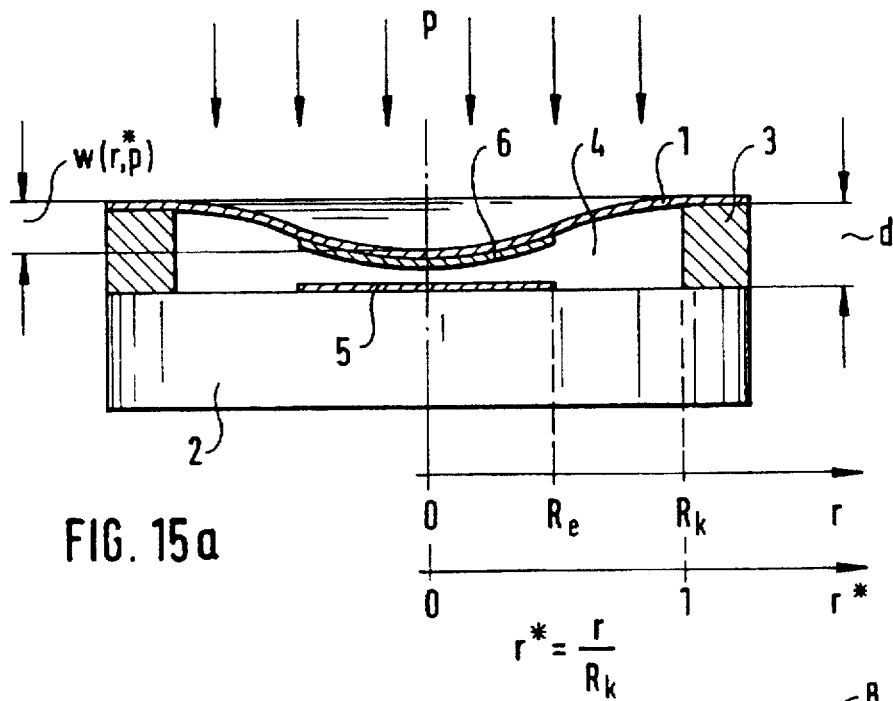

First, a few basic relations in pressure sensors of the type described here, which are needed in the following description, will be explained with the aid of FIG. 15. FIG. 15a is a sectional view of the basic structure of a pressure sensor with a circular diaphragm 1 and a circular substrate 2. Diaphragm 1 and substrate 2 are held at a distance d from each other and joined by a spacing ring 3, forming a chamber 4.

The chamber-side surface of diaphragm 1 supports a diaphragm electrode 6, and the chamber-side surface of substrate 2 a substrate electrode 5. The electrodes 5, 6 are implemented with conductive layers, particularly metal layers, and they are circular; they have the same radius $R_e$, while the chamber 4 has the radius $R_k$.

From FIG. 15a it can be seen that the concrete radius values $R_e$, $R_k$ are elements of a radius variable r. According to a further scale shown in FIG. 15a, the radius variable r is related to the chamber radius $R_k$, whereby normalized radii $r^* = r/R_k$ are obtained. Thus the normalized radius has the value $r^* = 1$ at the edge of the chamber.

Under the action of an external pressure greater than the pressure in the chamber 4, the diaphragm 1 is deflected downwards. Under the action of an external pressure below the pressure in the chamber 4, the diaphragm 1 is deflected outwards. The external pressures are represented by the pressure variable p, hereinafter referred to as "pressure p" for simplicity. The deflection w of the diaphragm 1 is a function of both the pressure p and the radius variable r*; this is written in FIG. 15a as the function w(r*,p).

Figure 15B:
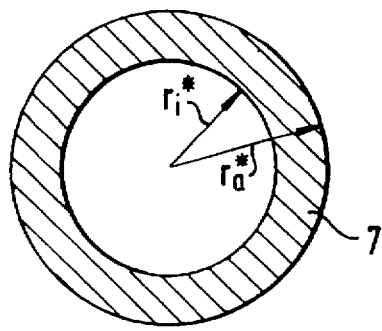
Figure 15C:
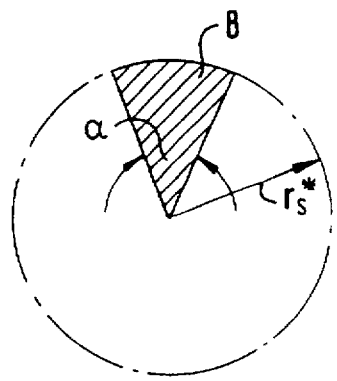

FIG. 15b shows an annular electrode 7 with its geometric data, namely inside radius $r^*_i$ and outside radius $r^*_a$. FIG. 15c shows a sector electrode 8 with its geometric data, namely angle α and radius $r^*_s$.

The annular electrode 7 of FIG. 15b has, as a substrate electrode in a pressure sensor according to FIG. 15a with a diaphragm electrode 6 covering the area of a full circle, the following pressure-dependent capacitance:

$$C_R(p) = C(r^*_a, p) - C(r^*_i, p) \tag{1}$$

The sector electrode 8 of FIG. 15c has, as a substrate electrode in a pressure sensor according to FIG. 15a with a diaphragm electrode 6 covering the area of a full circle, the following pressure-dependent capacitance:

$$C_\alpha(p) = 0.5(\alpha/\pi)C(r^*_s, p). \tag{2}$$

Equations (1), (2) obviously hold even if the annular electrode 7 or the sector electrode 8 are disposed not on the substrate 2, but on the diaphragm 1, and if, consequently, the respective full-circle electrode is a substrate electrode, because the same pressure-capacitance dependence is obtained. However, because of the shielding effect of a full-circle diaphragm electrode, a pressure sensor with such an electrode is less sensitive to electric interference fields than a pressure sensor with a full-circle substrate electrode.

Figure 15D:
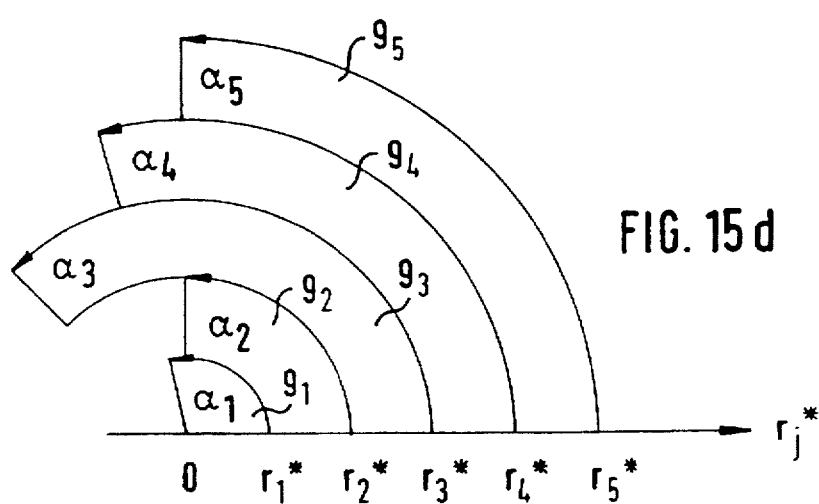

FIG. 15d serves to illustrate a general electrode shape with a boundary curve as can be seen, for example, in FIGS. 4a, 5a, 12a. Such boundary curves can be thought of as being formed from a number j of segmental-ring electrodes $9_1, 9_2, 9_3, 9_4, 9_5$ which extend over an associated angle $\alpha_1, \alpha_2, \alpha_3, \alpha_4, \alpha_5$. Using equation (2), the following formula for the capacitance C of an electrode with an arbitrary boundary curve can be derived:

$$C = \sum_{j=1}^{m} (1 - \alpha_j/\pi)[C(p, r^*_j) - C(p, r^*_{j-1})] \tag{3}$$

where $r^*_j$ and $\alpha_j$ are the values belonging to the jth known value in the formation of the sum Σ, and m is the number of known values. This formula obviously holds for an electrode covering, and proceeding from the center of, the circular diaphragm area, i.e., for the afore-mentioned measuring capacitance.

On the other hand, the capacitance Cr of an electrode extending from the edge of the chamber in the direction of the center, i.e., the reference capacitance, is given by $$C_r = [C(r^*, p) - C(r^*_i, p)] + \sum_{j=1}^{m} (\alpha_j/\pi)[C(r^*_j, p) - C(r^*_{j-1}, p)]. \tag{4}$$

To calculate as continuous a boundary curve as possible, i.e., a mathematically differentiable curve, use is made of the spline interpolation, which is known from statistics and makes it possible to calculate not only with j known values, but with further values lying between j and j+1.

In the embodiment of the first variant of the invention shown in FIG. 1b, the chamber-side surface of the diaphragm is completely covered with a diaphragm electrode 11, which is provided with an external connection 15.

The chamber-side surface of the substrate is covered with a reference electrode 12, which is provided with an external connection 16, see FIG. 1a. The reference electrode 12 consists of an outer portion 121, which extends along the edge of the chamber and forms a nearly closed ring and whose capacitance is virtually pressure-independent, and a pressure-dependent central portion 123, which is located at the center of the diaphragm and is connected with the outer portion via a connecting portion 122. The remainder of the diaphragm surface is covered with a measuring electrode 13, which is spaced from the reference electrode 12 by an essentially constant distance and is provided with an external connection 17.

From FIG. 1a it is thus apparent that both the reference capacitance $C_r$, determined by the reference electrode 12, and the measuring capacitance C, determined by the measuring electrode 13, are pressure-dependent, but to different extents, so that a linearization of the measuring capacitance C is possible.

Since the area of the measuring electrode 13 is reduced because the central portion 123 of the reference electrode 12 has been "cut out" from this area, the sensitivity of the pressure sensor is lower than that of a pressure sensor with a full-circle measuring electrode, but this is offset by the linearity improvement and by the extension of the operating-pressure range.

The measuring circuit is a conventional circuit which has the following transfer function F:

$$F = [C(p) - C_r(p)]/C(p). \tag{5}$$

Such a measuring circuit is shown, for example, in FIG. 18 of the above-mentioned WO 93/11415. If this circuit is used together with the invention, the capacitances $C_S$ and $C_R$ of that circuit must be replaced by the measuring capacitance C and the reference capacitance $C_r$, respectively.

FIG. 2 shows developments of the various electrodes of FIG. 1 for the case where a conventional differential-path-amplifier-like measuring circuit as shown, for example, in the journal "Sensors and Actuators A", Vol. 34 (1992), pages 77 to 83, FIG. 2, is used. If such a circuit is used together with the invention, the capacitances $C_{S1}$, $C_{S2}$ of that circuit must be replaced by the two measuring capacitances described below, and the capacitances $C_{R1}$, $C_{R2}$ of that circuit must be replaced by the two reference capacitances described below.

In FIGS. 2a and 2b, the electrodes of FIG. 1 have been halved, so to speak, by making a diametric horizontal cut therethrough. As a result, both the measuring electrode and the reference electrode are divided into two halves 120, 120' and 130, 130', respectively, which are virtually equal in area and are symmetrical with respect to the center of the diaphragm, see FIG. 2a.

Each of the reference-electrode halves 120, 120' consists of a virtually half-ring-shaped outer portion 121', 121", a connecting portion 122', 122", and a semicircular central portion 123', 123". The four electrode halves thus obtained are provided with associated connections 160, 160', 170, 170'.

Parallel to the aforementioned cut, the diaphragm electrode is divided into two equal halves 110, 110', which are provided with connections 150, 150', see FIG. 2b. Thus, two virtually equal measuring capacitances and two virtually equal reference capacitances are obtained.

FIG. 3 shows a family of characteristics of the linearity error L of a pressure sensor according to FIG. 1 in comparison with the linearity error of a nonlinearized pressure sensor with a pressure-independent reference electrode (dashed curve). The family of characteristics was determined taking the following parameters of an implemented ceramic pressure sensor as a basis:

$p_0$=500 kPa=bearing pressure of the diaphragm on the substrate $p_m$=0.4$p_0$ to 0.8$p_0$=linear pressure range from 0 to $p_m$ $d_m$=0.2 mm=lateral minimum spacing of the electrodes R=12.5 mm=free diaphragm radius E=300 GPa=module of elasticity of the diaphragm material h=0.635 mm=thickness of the diaphragm d=30 µm=height of the chamber.

In the embodiment of the second variant shown in FIGS. 4a and 4b, the chamber-side surface of the diaphragm is completely covered with a diaphragm electrode 21, which is provided with an external connection 25.

The chamber-side surface of the substrate is covered with a reference electrode 22, which is provided with an external connection 26, see FIG. 4a. The reference electrode 22 consists of an outer portion 221, which extends along the edge of the chamber and forms a nearly closed ring and whose capacitance is virtually pressure-independent, and two pressure-dependent central portions 223 and 223', which are connected with the outer portion via connecting portions 222 and 222', respectively.

The central portion 223 lies in one half of the substrate and is centrosymmetric with respect to the other central portion 223'. The boundary curve is continuous and is optimized by interpolation. It is computed by an iterative process using Equations (3), (4). The result data of a first run serve as input data for the next run. This is repeated until the desired linearity optimum is reached.

The remainder of the substrate surface is covered with a measuring electrode consisting of centrosymmetric portions 23, 23', which is spaced from the reference electrode 22 by a constant distance and is provided with an external connection 27. The two centrosymmetric portions 23, 23' are interconnected at the center of the diaphragm by a short conductive strip.

FIG. 5a shows developments of the electrodes of FIG. 4a for the case where a differential-path-amplifier-like measuring circuit of conventional design is used for the measurement. Therefore, the electrodes of FIG. 5a, like those of FIG. 2a, are halved, so to speak, by a diametric cut through them. As a result, both the measuring electrode and the reference electrode are divided into two halves 220, 220' and 230, 230', respectively, which are substantially equal in area and symmetrical with respect to the center of the diaphragm.

Each of the reference-electrode halves 220, 220' consists of a virtually half-ring-shaped outer portion 221', 221'', a connecting portion 222', 222'', and a central portion 223'', 223*. The four electrode halves thus obtained are provided with associated connections 260, 260', 270, 270'.

Parallel to the aforementioned cut, the diaphragm electrode is divided into two equal halves 210, 120', which are provided with connections 250, 250', see FIG. 5b.

FIG. 6 shows a curve of the linearity error L of a pressure sensor as depicted in FIG. 4a in comparison with the linearity error of a nonlinearized pressure sensor with a pressure-dependent reference electrode (dashed curve). When comparing this figure with FIG. 3 one can see that the fluctuations of the linearity error present in FIG. 3 have virtually disappeared and that the pressure sensor thus has a virtually constant linearity error over the entire pressure range.

FIG. 7 shows, in polar coordinates α, r*, the aforementioned boundary curve of the respective central electrode portion 123, 123' of FIG. 4a or of the respective central electrode portion 223'', 223* of FIG. 5a over an angle of 180°, the boundary curve being calculated by iteration. FIG. 7 further shows the half-ring-shaped outer portion 221, 221', which has a normalized inside radius $r_i^*$ of approximately 0.78 and a normalized outside radius $r_a^*$ of approximately 0.97.

For better readability of the α-r* value pairs belonging to each point of the boundary curve, FIG. 8 shows this boundary curve in Cartesian coordinates. It turns out that the boundary curve runs as follows:

Between r*=approx. 0.77 and r*=approx. 0.60, α is approximately constantly 3°; between r*=approx. 0.60 and r*=approx. 0.55, α increases to 20°; then it rises virtually linearly to a value of α=approx. 120° at r*=approx. 0.51. From there, a first angle maximum of α=approx. 138° is reached at r*=approx. 0.46. This is followed by an initially gradual, then virtually linear, and then somewhat more gradual fall to a first angle minimum of α=approx. 37° at r*=approx. 0.28. From there, the curve rises first slowly, then virtually linearly, and then again somewhat more slowly to a second angle maximum of α=approx. 120° at r*=approx. 0.21. Then it falls off essentially linearly to a second angle minimum of α=approx. 40° at r*=approx. 0.12. This is followed by an essentially linear rise to a third angle maximum of α=approx. 137 at r*=approx. 0.08. Finally the curve falls essentially linearly to 90° at r*=0.

The shape and, thus, the individual α-r* value pairs of the boundary curve illustrated in FIGS. 7 and 8 can be determined as follows:

A linearity error function L(p, Γ) of the pressure sensor is defined, where $\Gamma = (\alpha_1 \ldots \alpha_N)^T$ is a vector which, as already explained above, contains the angles $\alpha_i$ [i=1 ... N] which describe the boundary curve. The exponent T indicates that the vector is a transposed row vector, i.e., a column vector.

The optimization condition is that the angles $\alpha_i$ have to be chosen so that the linearity error is minimized. To this end, the linearity error function L(p, r) is examined at M given values of the pressure p, namely at the given values $P_j$ [j=1 ... M; with, e.g., M=50], in the range $0 < p_j \leq p_{max}$.

This gives M linearity error functions $$L_j(\Gamma) = L(p_j, \Gamma), \quad (6)$$

which have to be regarded as objective functions whose respective absolute values have to be minimized. This corresponds to a simple minimization if the objective function multiplied by −1, $$L_{j+M}(\Gamma) = -L(p_j, \Gamma) \quad (7)$$

is additionally used.

To ensure that the pressure sensor can be implemented, the angles $\alpha_i$ may vary only between an upper critical angle $\alpha_{oi}$ and a lower critical angle $\alpha_{ui}$, i.e., $\alpha_{ui} \leq \alpha_i \leq \alpha_{oi}$.

Now the vector Γ for which the overall objective function $$Z(\Gamma) = \max L_j(\Gamma) \quad (8)$$

j=1 ... 2M assumes a minimum under the linear secondary conditions $$\alpha_i - \alpha_{ui} \leq 0 \quad (9)$$

$$\alpha_{oi} - \alpha_i \leq 0 \quad (10)$$

has to be determined.

To solve this nonlinear problem, use is made of a computer program which utilizes an iterative process with the start value $\Gamma^{(0)}$. The exponent in parentheses, (0), which is to be regarded only as an index, designates the iteration step. In each of these steps, a solution for Γ which is improved over the preceding step is to be found.

First, the nonlinear objective functions $L_j(\Gamma)$ are linearized at the value $\Gamma^{(0)}=|\alpha_1^{(0)} \ldots \alpha_N^{(0)}|$ as follows:

$$'L_j(\Gamma) = L_j(\Gamma^{(0)}) + \sum_{i=1}^{N} \frac{\delta L_j(\Gamma)}{\delta \alpha_i}\bigg|_{\Gamma = \Gamma^{(0)}} (\alpha_i - \alpha_i^{(0)}) \quad (11)$$

$$|j=1\ldots 2M|$$

The partial differentiations $\delta L_j(\Gamma)$, $\delta\alpha_i$ can also be approximated by difference quotients. With the linearized objective functions, the piecewise linear overall objective function to be minimized is obtained:

$$'Z(\Gamma)=\max\, 'L_j(\Gamma)$$

$$j=1\ldots 2M$$

Since the linearization represents a good approximation only in a certain neighborhood of $\Gamma^{(0)}$, the region permissible for $\Gamma$ is limited to a hypercube around the start value in the first iteration step and to a hypercube around the last found, improved solution in the following iteration steps.

This is done using the two additional secondary conditions $$\alpha_i - \alpha_i^{(0)} + \theta_i^{(0,0)} \leq 0 \quad (12)$$

$$\alpha_i^{(0)} - \alpha_i + \theta_i^{(0,0)} \leq 0 \quad (13)$$

where $\theta_i^{(0,0)}$ are the start values for the edge lengths of the hypercube. These start values are changed during the optimization, as will be explained below.

The linear minimax problem with the linearized objective functions according to Equation (11) and the secondary conditions (9), (10), (12), (13) is now transformed into a problem of linear programming with an objective function. To this end, a parameter vector expanded by a new variable s, namely a vector $\sigma = (\alpha_i \ldots \alpha_N, )T$ is introduced and a new objective function $y(\sigma) = s$ is defined. The objective functions (11) become secondary conditions $$s - 'L_j(\Gamma) \leq 0; j=1\ldots 2M \quad (14)$$

Required is that vector a for which $y(\sigma)=s$ assumes a minimum under the secondary conditions (9), (10), (12), (13), (14). This, however, is a problem which can be solved with the simplex algorithm for linear programming described in a book by W. H. Press, "Numerical Recipes", Cambridge University Press, 1987.

Since only positive variables are permissible in the simplex algorithm, the following variable transformation is performed:

$$\alpha_i' = \frac{\alpha_i + \theta_i - \alpha_i^{(0)}}{2\theta_i} \quad (15)$$

This variable transformation involves a normalization to the interval $|0, 1|$. The secondary conditions (12), (13) are now:

$$\alpha_i' \geq 0 \quad (16)$$

$$\alpha_i' \leq 1 \quad (17)$$

The inequalities (16) are satisfied automatically by the simplex algorithm, so that only the inequalities (17) have to be explicitly entered in the simplex table.

As the solution of the linearized problem, a (new) point $\Gamma^{(0,1)}$ is obtained. The first number in the index parentheses (0, 1) again indicates the number of the iteration step, while the second number designates iterative changes within this iteration step.

A check must now be made to determine whether $\Gamma^{(0,1)}$ has yielded an improved solution according to the criteria explained below. If that is the case, $\Gamma^{(0,1)}$ can be chosen as the starting point $\Gamma^{(1)}$ of a new iteration step, which begins with a further linearization of the objective functions $L_j(\Gamma)$ around a new point $\Gamma^{(1)}$.

If $\Gamma^{(0,1)}$ is not an improved solution of the nonlinear problem, the size of the hypercube will be reduced by a predetermined quotient $q<1$ (e.g., $q=\frac{1}{2}$):

$$\theta_i^{(0,1)} = q\theta_i^{(0,0)}; i=1\ldots N$$

and the linearized problem will be solved anew with the changed secondary conditions, with yields the point $\Gamma^{(0,2)}$.

This process is iterated until an improved or equivalent approximation is achieved for the nonlinear problem or until the size of the hypercube is less than a predetermined size. In the latter case, the process must be truncated; however, the improved solution found is still utilizable.

If an improvement in the solution of the nonlinear problem is achieved without a reduction in the size of the hypercube, the hypercube will be enlarged by a factor of $f>1$ (e.g., $f=2$) for the next iteration step, so that $$\theta_i^{(0,1)} = f\theta_i^{(0,0)}; i=1\ldots N$$

The entire process is repeated until the changes in the parameter values and in the objective functions from one step to the next pass below predeterminable accuracy limits.

By "an improved solution of the nonlinear problem", the following is to be understood: Since the nonlinear problem described by Equations (8), (9), (10) contains only nonlinear secondary conditions, they are also satisfied at the point found as the solution of the linearized problem. It therefore suffices to examine the values of the objective function of Equation (8).

For an improved solution of the nonlinear problem, the following holds:

$$Z(\Gamma^{(1)}) - 'Z(\Gamma^{(1)}) \leq a[Z(\Gamma^{(0)}) - 'Z(\Gamma^{(1)})]; a>0 \quad (18)$$

This means that the difference between the objective-function value of the nonlinear problem and the objective-function value of the linearized problem at the new point $\Gamma^{(1)}$ must be less than or equal to the difference between the objective-function value at the beginning of the iteration step and the minimum objective-function value of the linearized problem multiplied by the factor a.

In case of convergence difficulties, the factor a can be varied. $a=1$ means that all smaller or equal objective-function values are accepted as an improved solution, while $a<1$ means that a minimum improvement must be achieved, and $a>1$ means that even impaired solutions are temporarily accepted. As a rule, $a=1$ can be used.

In the embodiment of the third variant shown in FIG. 9a, the chamber-side surface of the diaphragm is completely covered with a rectangular diaphragm electrode 41, which is provided with an external connection 45, see FIG. 9b.

The chamber-side surface of the substrate is covered with a reference electrode 42, which is provided with an external connection 46, see FIG. 9a. The reference electrode 42 consists of an outer portion 421, which extends along the edge of the chamber, and two pressure-dependent central portions 423 and 423', which are connected with the outer portion via connecting portions 422 and 422', respectively, and which are linked at the center of the diaphragm by a short conductive strip.

The capacitance of the outer portion 421 is virtually pressure-independent, and the outer portion forms a nearly closed ring whose lateral dimensions, unlike those of the ring-shaped outer portion 221 of FIG. 4a, are not constant but vary because of the rectangular shape.

The central portion 423 and the other central portion 423' are symmetrical with respect to the center of the substrate.

The boundary curves in the two substrate halves are continuous and, like in the circular embodiments, are optimized by interpolation.

The remainder of the substrate surface is covered with a measuring electrode 43, which is spaced from the reference electrode 42 by a virtually constant distance and has an external connection 47.

FIG. 10 shows a development of the electrodes of FIG. 9a for the case where a differential-path-amplifier-like measuring circuit of conventional design is used for the measurement. Therefore, the electrodes of FIG. 10a, like those of FIGS. 2a and 5a, are halved, so to speak, by a diametric cut through them.

As a result, both the measuring electrode and the reference electrode are divided into two virtually equal-area halves 420, 420' and two virtually equal-area halves 430, 430', respectively, which are partly symmetrical with respect to the center of the diaphragm.

Each of the reference-electrode halves 420, 420' consists of a substantially half-ring-shaped outer portion 421', 421", a connecting portion 422', 422", and a central portion 423", 423*. The four electrode halves thus obtained are provided with associated connections 460, 460', 470, 470'.

Parallel to the aforementioned cut, the diaphragm electrode is divided into two equal halves 410, 410', which are provided with connections 450, 450', see FIG. 10b.

In the embodiment of the fourth variant shown in FIG. 12, the chamber-side surface of the diaphragm is completely covered with a diaphragm electrode 31, which is provided with an external connection 35, see FIG. 12b.

The chamber-side surface of the substrate is covered with a reference electrode 32, which is provided with an external connection 36, see FIG. 12a. The reference electrode 32 consists of an outer portion 321, which extends along the edge of the chamber and whose capacitance is virtually pressure-independent and which forms a nearly closed ring, and a pressure-dependent middle portion 324 with an adjoining central portion 323, which are connected with the outer portion via a connecting portion 322. Middle portion 324 and central portion 323 are symmetrical with respect to the substrate diameter containing the connecting portion 322. The boundary curve in each of the substrate halves is continuous and optimized by interpolation, as in FIG. 4.

The remainder of the substrate surface is covered with a measuring electrode 33, which is spaced from the reference electrode 32 by a constant distance and is thus axisymmetrical in the same manner as the reference electrode 32. The measuring electrode 33 is provided with a connection 37.

A comparison between the arrangement of FIG. 12a and that of FIG. 4a shows that in the arrangement of FIG. 12a no distance is necessary between the upper and lower electrode halves, so that the electrode surfaces can be enlarged by the portion of this distance. However, this advantage is obtained at the expense of the fact that the pressure sensor becomes slightly unsymmetrical, so that unlike in the first and second variants, any fabrication-process-induced inclination of the diaphragm, i.e., any not exactly parallel relationship of the diaphragm with the diaphragm electrode, cannot be compensated for.

To permit a better numerical comparison than is possible with FIG. 3, the table of FIG. 13 contains numerical values for the maximum $F_{max}$ of the transfer function F and for the maximum $L_{max}$ of the linearity error L in dependence upon the quotient $P_m/P_0$ for the first variant of the invention (=column B) and for a simple pressure sensor without corresponding correction areas (=column A). From the table it can be seen that with the first variant of the invention, an improvement of the linearity error L by approximately a factor of 10 is attainable.

FIG. 14 shows a further table with characteristics of various implemented pressure sensors in accordance with the invention. The following common design quantities were chosen for the pressure sensors to be compared:
Bearing pressure $p_0$: 500 kPa
Free diaphragm radius R: 25 mm
Distance $d_m$ between electrodes: 29 µm In the table of FIG. 14, column A, like column A of FIG. 13, contains the values for a nonlinearized pressure sensor. Column B contains the values for a pressure sensor according to the first variant shown in FIG. 1, and column C contains the values for a pressure sensor according to the second variant shown in FIG. 4.

The individual rows of the table define:
the pressure range p,
the value of the transfer function F in the pressure range p,
the two identical values of the quiescent capacitances $C_0$, $C_{r0}$,
the variation $H_C$ of the measuring capacitance C in the pressure range p,
the variation $H_{Cr}$ of the reference capacitance $C_r$ in the pressure range p, and
the relative capacitance variation $H_r = H_C/H_{Cr}$ in the pressure range p.

From the two parts of column C of FIG. 14, of which the one on the left-hand side contains the values for the pressure range of 0 to 2 hPa (1 hPa=$10^5$ Pa), which is also given in columns A and B, it can be seen that in comparison with columns A and B, a pressure range two and a half times greater, namely a range of 0 to 5 hPa, is possible. As a result, the relative variation $H_r$ is also significantly increased.

The electrode surfaces of the pressure sensors according to the invention can be fabricated in thick-film or thin-film technology, e.g., on ceramic, preferably on alumina ceramic. Pressure sensors in silicon technology with electrode surfaces dimensioned in accordance with the invention can also be implemented.

We claim:

1. A capacitive pressure sensor comprising a diaphragm and a substrate which are joined together parallel to each other in a defined space relationship, forming a chamber sealed at least at the edge, with the chamber-side surface of the diaphragm being circular and supporting a diaphragm electrode completely covering said surface, the chamber-side surface of the substrate being circular and supporting a reference electrode consisting of a single outer portion, which extends along the edge of the chamber and whose capacitance is virtually pressure-independent, and two pressure-dependent central portions connected with said single outer portion via one connecting portion each, which are each located in one half of the substrate symmetrically with respect to the substrate center, and whose boundary curves are continuous and are optimized by an iterative process to maximize linearity over a broad range of pressures, and a measuring electrode covering substantially all of the remainder of the substrate surface following the boundary curves of the two central portions and being spaced an essentially constant distance from the reference electrode.

* * * * *